US007224558B2

(12) United States Patent
Chu

(10) Patent No.: US 7,224,558 B2
(45) Date of Patent: May 29, 2007

(54) METHOD AND APPARATUS FOR ELECTROMECHANICALLY INTERRUPTING AND RECONNECTING CIRCUITS

(75) Inventor: Raymond Wai Hang Chu, Chaiwan (HK)

(73) Assignee: Defond Components Limited, Chaiwan (HK)

( * ) Notice: Subject to any disclaimer, the term of this patent is extended or adjusted under 35 U.S.C. 154(b) by 0 days.

(21) Appl. No.: 10/933,151

(22) Filed: Sep. 2, 2004

(65) Prior Publication Data

US 2006/0044085 A1 Mar. 2, 2006

(51) Int. Cl.
*H02H 3/00* (2006.01)

(52) U.S. Cl. ........................ 361/42; 200/42.01; 335/6; 335/21; 335/172

(58) Field of Classification Search ............ 200/42.01; 361/42, 93.1, 117; 335/6, 21, 172
See application file for complete search history.

(56) References Cited

U.S. PATENT DOCUMENTS

2003/0000032 A1 * 1/2003 Lev ............................ 15/28
2003/0000033 A1 * 1/2003 Lev et al. .................... 15/28

* cited by examiner

*Primary Examiner*—Ramon M. Barrera
(74) *Attorney, Agent, or Firm*—Merchant & Gould P.C.

(57) ABSTRACT

An apparatus and method for circuit interruption, with auto-power on and fault memory. The interrupter includes first and second locks in series with one another, and in series between the circuit driving source and load. The first lock is in communication with the circuit driving source. Control circuitry may be disposed between the circuit driving source and the first lock. When either lock is open the circuit is open; with both locks closed the circuit is closed. Actuating one lock does not change the state of the other lock. While closing input such as a power signal is applied to the first lock it is closed, and while the closing input is not applied it is open. When an opening input such as a fault signal is applied the second lock opens, and when a closing input such as a reset signal is applied the second lock closes.

20 Claims, 7 Drawing Sheets

METHOD AND APPARATUS FOR ELECTROMECHANICALLY INTERRUPTING AND RECONNECTING CIRCUITS

FIELD OF THE INVENTION

The invention relates to an apparatus and method for interrupting a circuit in the event that a fault is detected in that circuit. The invention relates more particularly to a circuit interrupter that retains a memory of the fault condition of the circuit regardless of whether the power fails.

BACKGROUND OF THE INVENTION

Circuits of various kinds are susceptible to a number of fault conditions. The types of faults a given circuit may experience depend at least in part on the type of circuit. For example, in an electrical circuit, damage to wiring and/or insulation may lead to electrical arcing between or within the wires, or between the wires and other structures. This is commonly referred to as an arc fault.

It is noted that many other types of faults, both in electrical circuits as well as pneumatic circuits, hydraulic circuits, and other circuits, are known. For exemplary purposes, arc faulting in an electrical circuit will be referred to herein as a specific example of a fault for purposes of description of the present invention. However, it is to be understood that the present invention is not limited to use with arc faults only, nor is it necessarily limited to use with electrical circuits only.

Returning to the specific example of arc faulting, the presence of an arc fault in an electrical circuit often is undesirable. Under some conditions, arc faulting potentially can pose a hazard to the circuit, to components thereof, to nearby materials, equipment, and persons, etc. Therefore, if arc faulting is detected within a circuit, it may be desirable to perform some action to oppose the fault, and/or to provide an indication that a fault has occurred.

Commonly, faults are opposed by interrupting the circuit that is experiencing the fault.

As a result, fault circuit interrupters are coming into use, for interrupting a circuit in the event that a fault is detected. However, conventional fault circuit interrupters are not entirely satisfactory.

For example, conventional circuit interrupters typically utilize only one lock, or interrupting mechanism, to open or break the circuit. With the lock closed, the circuit is closed; with the lock open, the circuit is open.

However, in some instances it also may be desirable to break an electrical circuit in the event that power to that circuit fails, or is shut off. Such a feature is increasingly required in commercial electrical circuits.

Conventional circuit interrupters either lack any means for opening the circuit when no power is applied, or use the same means as are used to open the circuit if and when a fault is detected.

The former approach, of course, does not provide the desired feature. The latter approach, however, may make it difficult to determine when and whether a fault has actually occurred.

For example, if the circuit interrupter interrupts the circuit, it may not be immediately apparent whether the circuit has been interrupted due to a fault or due to loss of power. Even if it is determined that the power has failed, there still is no positive indication as to whether a fault is or is not present as well.

Moreover, if the circuit experiences a fault, but the power then either fails or is deliberately terminated, there is no longer any clear evidence that the fault occurred, since the lock would have opened when the power failed regardless of whether a fault was present.

This may be of particular concern since, commonly, power to a circuit may be deliberately terminated when a fault is detected in order to avoid potential risks due to live power wires, etc.

Conversely, certain types of faults can, in certain circuits, cause power failures in and of themselves, for example by damaging a circuit component, producing a short that draws so much current that a circuit breaker or fuse opens, etc. In such an instance, it also may not be clear whether a power failure or a fault occurred, or if both occurred, which caused the other (if indeed one did cause the other).

Thus, the use of a single lock for both opening the circuit when power is lost and opening the circuit when a fault is detected can obscure the issue of whether either a power loss, a fault, or both are present.

In addition, with such a conventional arrangement, it may not always be necessary to take positive action in order to reset a circuit once the interrupter has opened the circuit. In at least some instances, the lock is designed so that if it is open when power is turned on, it closes by itself. Such a feature may in some circumstances be useful with regard to turning power on and off, in that if the circuit automatically opens when power is lost, it may be considered advantageous for the circuit to automatically close again when power returns.

However, if the same lock also responds to faults, the fault condition may cause recurrence simply by cycling the power on and off. Unless the matter is specifically investigated, under some circumstances the user may not even be aware that a fault occurred.

SUMMARY OF THE INVENTION

It is the purpose of the claimed invention to overcome these difficulties, thereby providing an improved apparatus and method for interrupting circuits, particularly for interrupting electrical circuits in the presence of faults.

An exemplary embodiment of circuit interrupter in accordance with the principles of the present invention includes a first lock and a second lock. The first and second locks are in series with one another, and are in series between the driving source for the circuit and the circuit load. The locks are arranged such that when the first lock is closed and the second lock is closed the circuit is closed, and when either or both the first and second locks are open the circuit is open.

The first lock is in communication with the driving source of the circuit.

Actuating the first lock between open and closed states does not change the state of the second lock. Likewise, actuating the second lock between open and closed states does not change the state of the first lock.

The first lock functions such that while a first closing input is applied to it, the first lock is closed, and while the first closing input is not applied the first lock is open.

The second lock functions such that when a second opening input is applied to it the second lock opens, and when a second closing input is applied the second lock closes.

The circuit interrupter may be an electrical circuit interrupter.

The first lock may include first contacts in electrical communication with the driving source, with the first contacts being movable between an open position and a closed position, wherein when the first contacts are in the open position the first lock is open, and when the first contacts are in the closed position the first lock is closed. The first lock also may include a first actuator engaged with the first contacts so as to actuate the first contacts between the open and closed positions, such that while the first closing input is applied to the first contacts the first contacts are in the closed position, and while the first closing input is not applied to the first contacts the first contacts are in the open position.

The first actuator may include a device operable for expanding and contracting a magnetic field. Preferably, the device may be but is not limited to a solenoid.

The first closing input may be a driving signal for the circuit.

The second lock comprises second contacts in electrical communication with the load of said circuit, with the second contacts being movable between an open position and a closed position, wherein when the second contacts are in the open position the second lock is open, and when the second contacts are in the closed position the second lock is closed. The second lock also may include a second actuator engaged with the second contacts so as to actuate the second contacts between the open and closed positions, such that when the second opening input is applied to the second contacts the second actuator opens the second contacts, and when said second closing input is applied to the second contacts the actuator closes the second contacts.

The second actuator may include a device operable for expanding and contracting a magnetic field. Preferably, the device may be but is not limited to a solenoid.

The second opening input may be a fault signal indicative of a fault in the circuit. The second closing input may be a reset signal.

The second lock may include a manual actuator for manually actuating the second lock between the open and closed states.

The circuit interrupter may include control circuitry controlling the actuation of the first and second locks, the control circuitry being disposed between the first lock and the driving source.

The control circuitry may control the first and second locks such that while the first closing input is not applied to the first lock, both the first and second locks are open, and when the second opening input is applied to the second lock both the first and second locks open.

An exemplary embodiment of an arc fault circuit interrupter in accordance with the principles of the present invention includes an arc fault detector, and a circuit interrupter as described previously. The second lock is engaged with the arc fault detector such that when the arc fault detector detects an arc fault, the second lock opens.

Another exemplary embodiment of circuit interrupter in accordance with the principles of the present invention includes a first lock and a second lock. The first and second locks are in series with one another, and are in series between the driving source of the circuit and the load of the circuit. The first lock is in communication with the driving source of the circuit. The circuit interrupter is actuable among first, second, third, and fourth states.

In the first state, the first lock is open, and the second lock is open, whereby the circuit interrupter is open. In the second state, the first lock is closed, and the second lock is open, whereby the circuit interrupter is open. In the third state, the first lock is closed, and the second lock is closed, whereby the circuit interrupter is closed. In the fourth state, the first lock is open, and the second lock is closed, whereby the circuit interrupter is open.

While a first closing input is applied to the first lock the first lock is closed, and while the first closing input is not applied the first lock is open. When a second opening input is applied to the second lock the second lock opens, and when a second closing input is applied to the second lock the second lock closes.

Actuating the first lock between open and closed states does not change the state of the second lock, and actuating the second lock between open and closed states does not change the state of the first lock.

The circuit interrupter may be an electrical circuit interrupter.

The first lock may include first contacts in electrical communication with the circuit driving source, the first contacts being movable between an open position and a closed position. The first lock also may include a first actuator engaged with the first contacts so as to actuate the first contacts between the open and closed positions.

The second lock may include second contacts in electrical communication with the circuit load, the second contacts being movable between an open position and a closed position. The second lock also may include a second actuator engaged with the second contacts so as to actuate the second contacts between the open and closed positions.

With such an arrangement, in the first state the first contacts are in the open position such that the first lock is open, and the second contacts are in the open position such that the second lock is open, whereby the interrupter is open. In the second state, the first contacts are in the closed position such that the first lock is closed, and the second contacts are in the open position such that the second lock is open, whereby the interrupter is open. In the third state, the first contacts are in the closed position such that the first lock is closed, and the second contacts are in the closed position such that the second lock is closed, whereby the interrupter is closed. In the fourth state, the first contacts are in the open position such that the first lock is open, and the second contacts are in the closed position such that the second lock is closed, whereby the interrupter is open.

The first and second actuators may include devices operable for expanding and contracting a magnetic field. Preferably, the devices may be but are not limited to solenoids.

The first closing input may be a driving signal for the circuit.

The second opening input may be a fault signal indicative of a fault in the circuit. The second closing input may be a reset signal.

The second lock may include a manual actuator for manually actuating the second lock between the open and closed states.

Another exemplary embodiment of an arc fault circuit interrupter in accordance with the principles of the present invention includes an arc fault detector, and a circuit interrupter as described previously. The second lock is engaged with the arc fault detector such that when the arc fault detector detects an arc fault, the fault signal is applied to the second lock, whereby the second lock opens.

An exemplary method of circuit interruption in accordance with the principles of the present invention includes disposing first and second locks in series with one another, and in series between a driving source of the circuit and a load of the circuit, with the first lock in communication with the driving source of said circuit. The method also includes maintaining the first lock closed while a first closing input is applied thereto, and maintaining the first lock open while a first closing input is not applied thereto. The method further includes opening the second lock when a second opening input is applied thereto, and closing the second lock when a second closing input is applied thereto. The first and second locks are independent of one another with regard to being open or closed.

The first closing input may be a driving signal for the circuit.

The second opening input may be a fault signal indicative of a fault in the circuit. The second closing input may be a reset signal.

The second opening input may be an arc fault signal indicative of an arc fault in the circuit.

The first and second locks may be controlled such that the first and second locks are maintained open while a first closing input is not applied to the first lock, and the first and second locks are opened when the second opening input is applied to the second lock.

BRIEF DESCRIPTION OF THE DRAWINGS

Like reference numbers generally indicate corresponding elements in the figures.

DETAILED DESCRIPTION OF THE PREFERRED EMBODIMENT

Figure 1A:
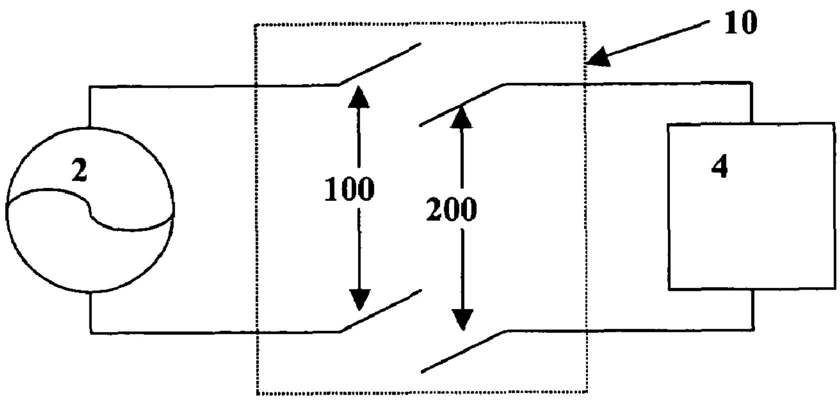
FIG. 1 is an electrical schematic of an exemplary embodiment of an apparatus for circuit interruption in accordance with the principles of the claimed invention.

FIG. 1 shows, in simple schematic form, an exemplary embodiment of a fault circuit interrupter 10 in accordance with the principles of the present invention, disposed within a circuit. The circuit includes a driving source 2 and a load 4.

In broad terms, an embodiment of the circuit interrupter 10 according to the present invention that is adapted for interrupting electrical circuits employs electromagnetic effects in its operation. Magnetic fields are expanded or collapsed in response to the presence or absence of electrical power in the circuit mains, as appropriate, in order to open and close the circuit interrupter 10 and thus to open or close the circuit. Through such an arrangement, features such as "auto-power on" and "fault memory function" are obtained.

However, although the circuit interrupter of the present invention is described below in terms of an electrical circuit interrupter, this is exemplary only, and certain embodiments of the present invention may be suitable for use with other circuits.

As shown, an exemplary embodiment of a circuit interrupter 10 in accordance with the principles of the present invention includes a first lock 100 and a second lock 200. Each of the first and second locks 100 and 200 may take one of two states, open or closed. The first lock 100 is in communication with the driving source 2, and the second lock 200 is in communication with the load 4.

As may be seen, the first and second locks 100 and 200 are in series with one another, and are in series between the driving source 2 and the load 4. Thus, if either or both of the first and second locks 100 and 200 is in the open state, the circuit interrupter 10 is likewise open, and consequently the circuit is open, or interrupted. Only if both the first lock 100 and the second lock 200 are closed is the circuit interrupter 10 closed.

This arrangement may be seen by a comparison of FIGS. 1A through 1D. In FIG. 1A, both the first and second locks 100 and 200 are open; consequently, the circuit interrupter 10 is open.

Figure 1B:
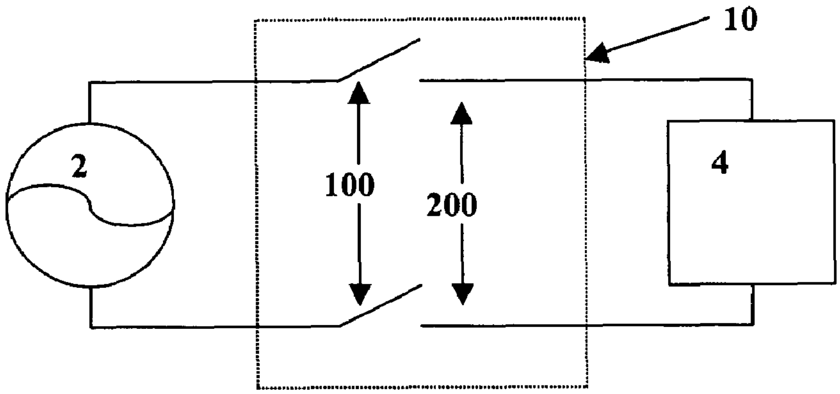

In FIG. 1B, the second lock 200 is closed, but the first lock 100 is open, so the circuit interrupter 10 also is open.

Figure 1D:
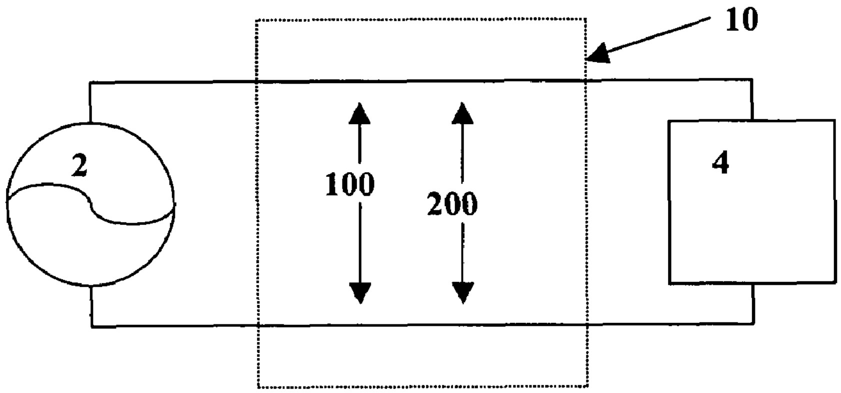
Figure 1C:
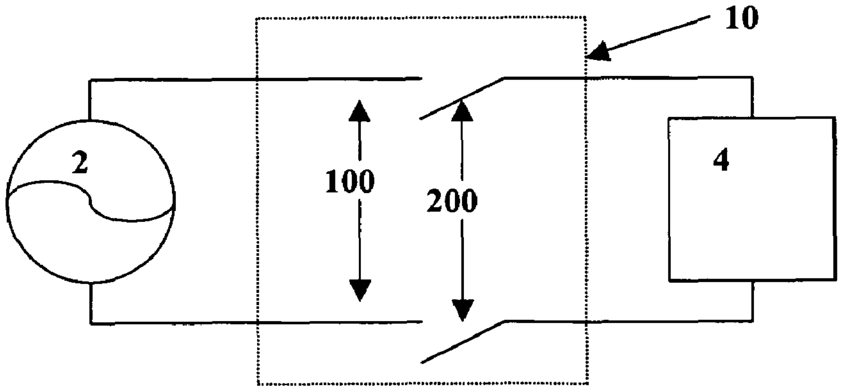

Conversely, in FIG. 1C, the first lock 100 is closed, but the second lock 200 is open, so the circuit interrupter 10 also is open.

Only in FIG. 1D, with both the first lock 100 and the second lock 200 closed, is the circuit interrupter 10 closed.

The first and second locks 100 and 200 are such that opening or closing one of them does not affect the state of the other. Although the first and second locks 100 and 200 cooperate to determine the state of the circuit interrupter 10 as a whole, the first and second locks 100 and 200 operate independently of one another.

Although the first and second locks 100 and 200 both actuate between two states, open and closed, they switch between states differently from one another.

The first lock 100 functions such that when a first closing input is applied to it, the first lock 100 is closed. That is, if open, the first lock 100 closes, and if closed, the first lock 100 remains closed. The first lock 100 stays in the closed state for as long as the first closing input is applied to it.

Contrariwise, when the first closing input is not applied to the first lock 100, the first lock is opened. If the first lock 100 is closed when the first closing input is interrupted, the first lock 100 opens. The first lock 100 stays in the open state for as long as no first closing input is applied to it.

Thus, the first lock 100 is closed while and only while the first closing signal is applied thereto.

The second lock 200 operates differently from the first lock. The second lock 200 functions such that when a second closing input is applied to it, the second lock 200 closes. If it is open when the second closing output is applied, the second lock 200 closes; if it is closed when the second closing output is applied, the second lock 200 remains closed.

Unlike the first lock 100, the second lock 200 does not change states in the absence of the second closing signal. That is, in the absence of the second closing signal, the second lock 200 does not change from closed to open, or from open to closed. In the absence of the second closing signal, the second lock 200 maintains its current state, whether open or closed. In particular, the second lock 200 does not open simply due to the removal or interruption of the second closing signal.

Similarly, when a second opening input is applied to the second lock 200, the second lock 200 opens. If it is closed when the second opening output is applied, the second lock 200 opens; if it is open when the second opening output is applied, the second lock 200 remains open.

As with the second closing signal, in the absence of the second opening signal the second lock 200 maintains its current state, whether open or closed.

Thus, the second lock 200 opens when the second opening input is applied, and remains open until the second closing input is applied. The second lock closes when the second closing input is applied, and then remains closed until the second opening input is applied.

This may be conveniently understood in terms of an exemplary electrical circuit, as follows.

Considering the circuit shown in FIG. 1 to be an electrical circuit, the drive source 2 is an electrical drive source, such as a battery, generator, wall socket, etc. For this exemplary circuit, the driving signal of the drive source 2, that is, the applied electrical power therefrom, may serve as the first closing signal. The first lock 100 is closed while the first closing signal is applied, and opened when the first closing signal is not applied. In this particular instance, then, the first lock 100 is closed so long as electrical power is applied to it, and is opened if no power is applied.

Continuing this example, a fault signal, such as that from a circuit fault detector (not shown) may serve as the second opening signal. A fault reset signal may serve as the second closing signal. Thus, the second lock 200 remains unchanged in status—i.e., it stays closed if it is already closed—so long as no fault signal is applied to it. If a fault signal is applied to the second lock 200, and the second lock 200 is closed, the second lock 200 opens and remains open. The second lock 200 does not close if the fault signal ends. Rather, the second lock 200 stays open until the fault reset signal is applied to it, whereupon the second lock 200 closes. Once closed, the second lock 200 stays closed until and unless the fault signal is reapplied.

As previously described, the state of the first lock 100 or a change therein does not affect the state of the second lock 200, and the state of the second lock 200 or a change therein does not affect the state of the first lock 100. In this example, whether or not power is applied to the first lock 100 does not impact the state of the second lock 200. Likewise, whether or not a fault or reset signal is applied to the second lock 200 does not influence whether power is applied to the first lock 100.

The circuit interrupter 10 as a whole thus is closed only while power is applied by the drive source 2, and so long as no fault signals have been sent, since the second lock 200 has been reset.

It may be said, therefore, that the circuit interrupter 10 has a "fault memory". The state of the second lock 200—which in this example is responsive to the fault status of the circuit—does not change if the power fails, or cycles on and off. The state of the second lock 200, whether open or closed, remains "memorized" until it is specifically changed by applying a fault signal (if the second lock 200 initially is closed) or a reset signal (if the second lock 200 initially is open).

It is emphasized that this arrangement is exemplary only; the present invention is not limited only to electrical circuits as described. Other circuits, including but not limited to pneumatic and hydraulic circuits, and optical circuits such as those utilizing controlled light polarization for lock actuation, may be equally suitable.

However, although the invention is not limited to use with electrical circuits only, for exemplary purposes the structure of a particular embodiment usable with electrical circuits is described in detail below.

Figure 2:
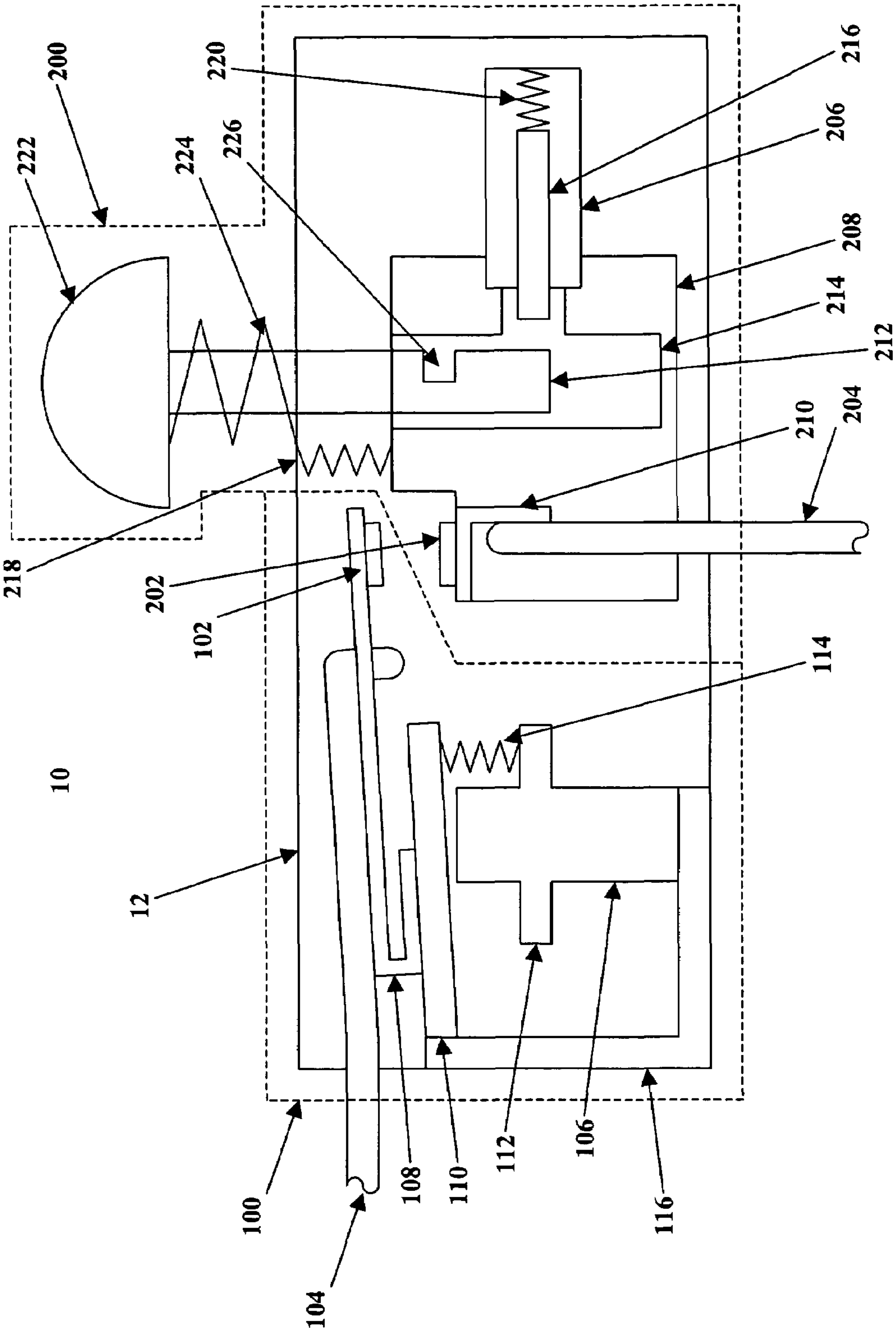
FIG. 2 is a block view of an exemplary embodiment of an apparatus for circuit interruption in accordance with the principles of the claimed invention, shown with the first and second locks open.

FIG. 2 shows an exemplary embodiment of a fault circuit interrupter 10 for an electrical circuit, in accordance with the principles of the present invention.

As in FIG. 1, the circuit interrupter 10 includes a first lock 100 and a second lock 200. As the first and second locks 100 and 200 include a variety of elements, they are distinguished from one another in FIG. 2 by the dashed lines enclosed their respective elements.

It is noted that FIGS. 2–5 show a the circuit interrupter 10 in the form of a simple cross-section, for purposes of clarity. Thus, only one of certain elements may appear, such as electrical contacts, conductors, etc., even though they may be present in pairs in an actual circuit interrupter 10. Certain such elements may be seen in pairs in FIG. 6, which shows a perspective view.

Figure 5:
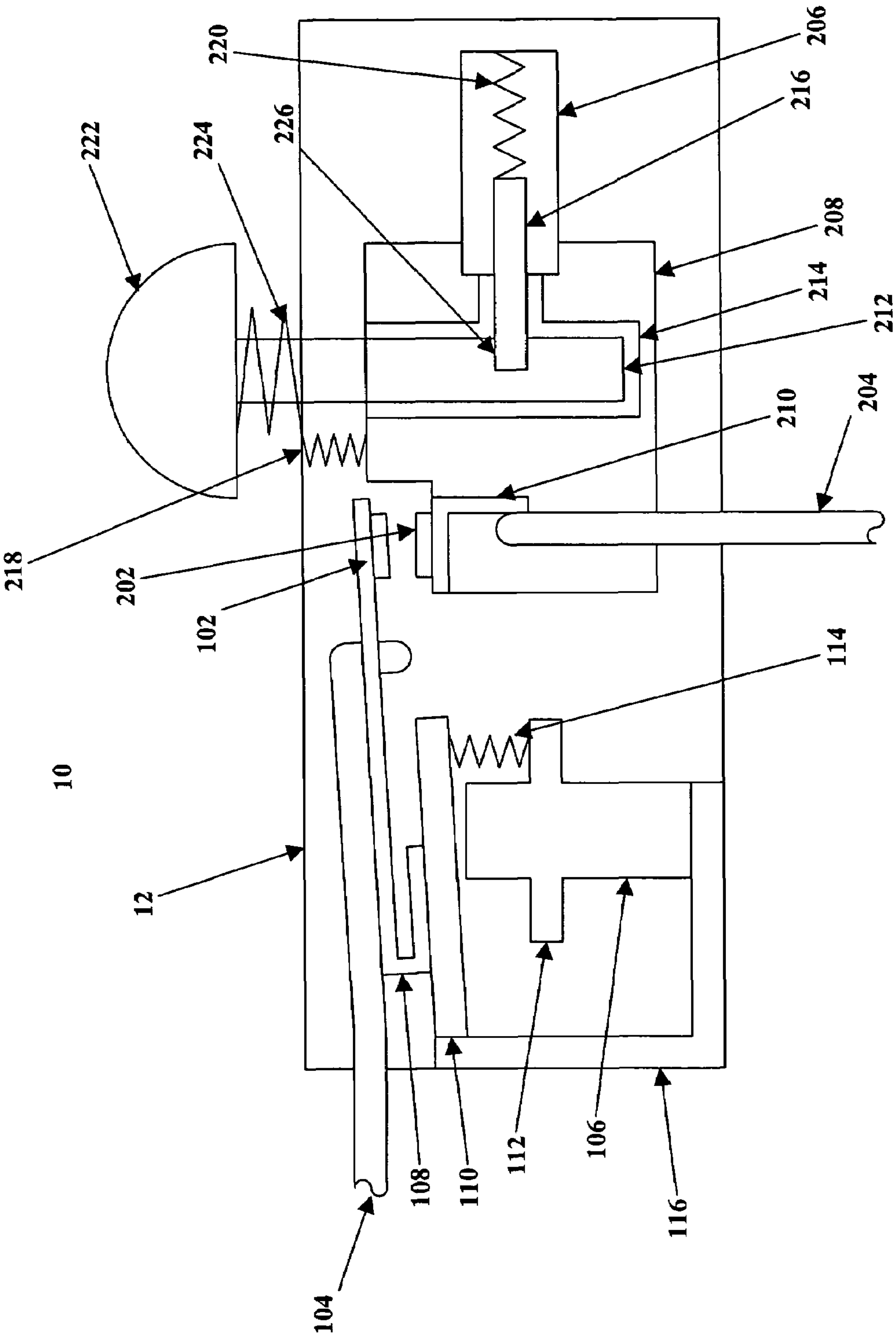
FIG. 5 is a block view of the apparatus of FIG. 2, shown with the first lock open and the second lock closed.
Figure 6:
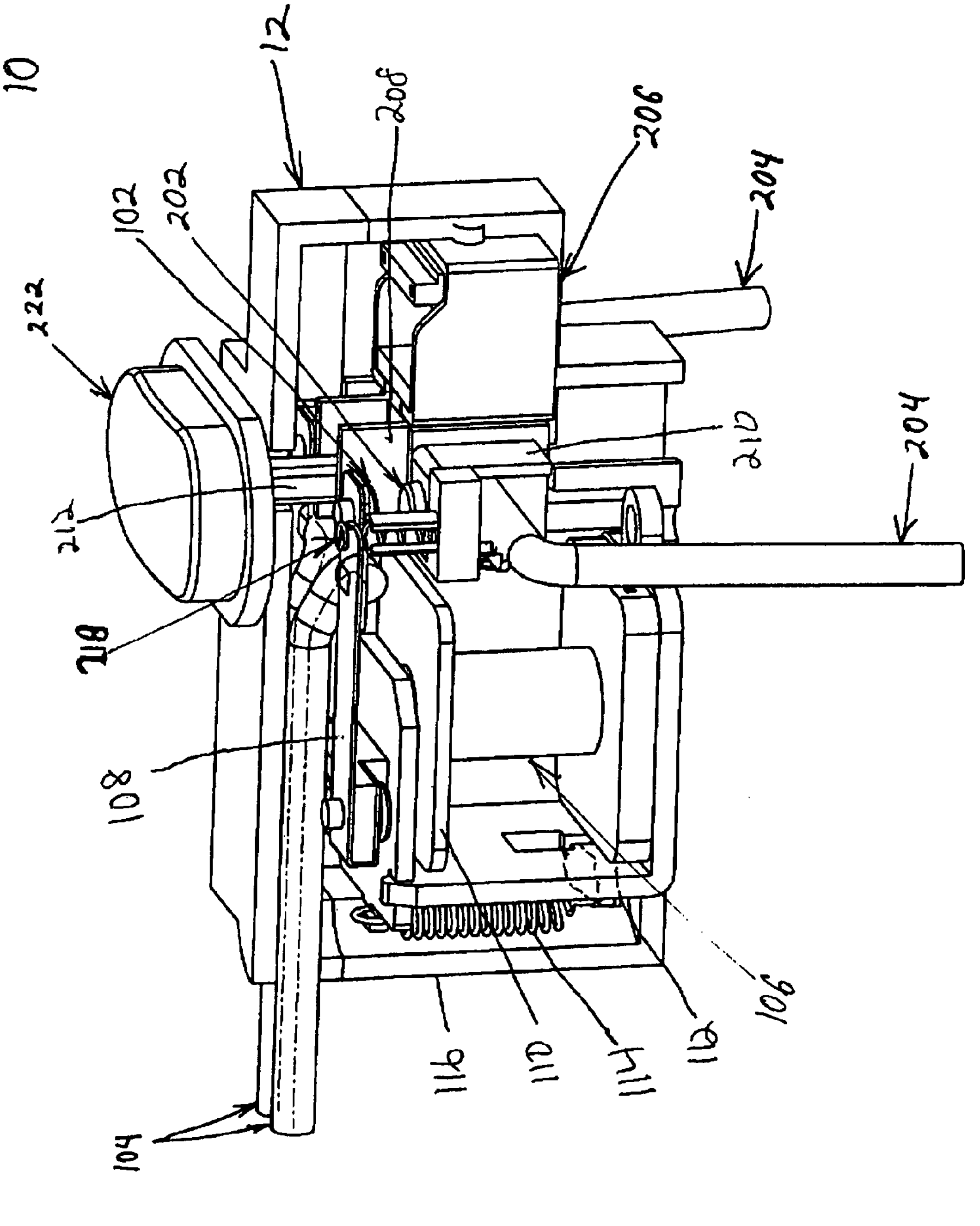
FIG. 6 is a perspective illustration of an exemplary embodiment of an apparatus for circuit interruption in accordance with the principles of the claimed invention.

However, it is noted that certain elements also may not be visible in FIG. 6. For example, the plunger latch notch 226 shown in FIGS. 2–5 would not be visible if defined in the same location in FIG. 6, since it would be obscured by other portions of the circuit interrupter 10.

In addition, it is emphasized that the particular structure shown in FIG. 6 is exemplary only.

For example, as illustrated the circuit interrupter 10 connects with the drive conductors 104 and the load conductors 204 by means of integral wires. However, this is done for simplicity and clarity of illustration, and is exemplary only. A variety of input and output terminations may be suitable for use with the present invention, including but not limited to terminal blades, screw terminals, lugs, PCB mounting pins, individual leadwires, and/or leadwires arranged together as in a mounting plug.

Likewise, although as illustrated in FIG. 6 the circuit interrupter 10 utilizes clapper-type relays, this is exemplary only, and other arrangements may be equally suitable.

Likewise, although an actuator bias 114 is illustrated as an extension spring, it will be appreciated that this is one exemplary embodiment only and that other arrangements may be equally suitable.

In FIG. 2, both the first and second locks 100 and 200 are shown in the open states.

In the exemplary embodiment of FIG. 2, the first lock 100 includes first contacts 102. The first contacts 102 are in electrical communication with the drive conductors 104, which are in turn in communication with the drive source 2 (not shown in FIG. 2).

As shown, the first contacts 102 are in electrical communication with the drive conductors 104 via a conductive upper armature 108. In particular, the drive conductors 104 are in electrical contact with the upper armature 108, and the first contacts 102 likewise are disposed on the upper armature 108, in electrical contact therewith.

The upper armature 108 in turn is engaged with the lower armature 110. In the arrangement illustrated, the lower armature 110 may be ferromagnetic, so as to provide functions as described below, though this may not be necessary for all embodiments. In addition, if electrically conductive, the lower armature 110 may be electrically isolated from the upper armature 108, first actuator frame 116, and/or first actuator 106 (see below) though this also may not be necessary in all embodiments.

The lower armature 110 is engaged with a first actuator frame 116. The lower armature 110 is engaged with the first actuator frame 116 in such fashion that the lower armature 110 is movable with respect thereto. Typically, the motion may include a pivoting motion about the point of contact between the lower armature 110 and the first actuator frame 116, although this is exemplary only, and other arrangements may be equally suitable. Likewise, the manner by which the relative motion is accomplished may vary. For example, in certain embodiments the lower armature 110 may be fixed rigidly with the first actuator frame 116, such that the pivoting motion is accomplished by elastic deformation of either or both the lower armature 110 and the first actuator frame 116. However, other arrangements, including but not limited to a hinge, pivot rod, bearing, etc. may be equally suitable.

The first contacts 102, drive conductors 104, upper armature 108, and lower armature 110 are movable as a unit, such that when the lower armature 110 moves by (for example) pivoting about the point of contact with the first actuator frame 116, the first contacts 102, drive conductors 104, and upper armature 108 also pivot about that point. With the first contacts 102 on the far end of the upper armature 108 from the pivot point as shown, this produces an motion of the first contacts 102 that is essentially linear and vertical when the lower armature 110 so pivots.

The first lock 100 also includes a first actuator 106. The first actuator 106 is engaged with the first contacts 102, directly or indirectly, in such fashion as to cause the first contacts 102 to move.

For example, in the arrangement shown in FIG. 2, the first actuator 106 is a device operable for expanding and collapsing a magnetic field. Preferably, such a device makes use of the broad concepts of electromagnetics. The first actuator may be a solenoid, such as but not limited to a clapper-relay solenoid. The solenoid, that is, the first actuator 106, is fixedly engaged with the first actuator frame 116. When power is applied to the circuit interrupter 10 via the drive conductors 104, the first actuator 106 (solenoid) is energized, whereupon the solenoid generates a magnetic field. The lower armature 110 is attracted to the first actuator 106 (solenoid).

When lower armature 110 is attracted to the first actuator 106 (solenoid), the lower armature 110 is pulled downwards, and pivots about the point of contact with the first actuator frame 116 as described above. Thus, as also described above, the first contacts 102 are displaced downwards in a motion that is essentially linear and vertical.

Thus, depending on whether the first actuator 106 is actuated, in this instance by power applied from the drive source 2, the first contacts 102 are in either an upper position (with no power applied) or a lower position (with power applied). The upper and lower positions are referred to for this exemplary embodiment as the open and closed positions respectively. Further discussion of this arrangement is provided below, with regard also to FIGS. 3–5.

The first lock 100 may include a first actuator bias 114, that biases the first lock 100 towards either the open or the closed state. As shown, the first actuator bias 114 is a compression spring disposed between a flange 112 on the first actuator 106 and the underside of the lower armature 110. However, arrangements that lack a first actuator bias 114, or that provides a bias using other arrangements, may be equally suitable. For example, for embodiments wherein the lower armature 110 is rigidly engaged with the first actuator frame 116, elastic distortion of the lower armature 110 and/or the first actuator frame 116 as the lower armature 110 pivots may itself bias the first contacts 102 towards their open or upper position.

In brief, then, the preceding structure described for the first lock 100 produces the functionality described for the first lock 100, that is, the first contacts 102 are in the upper, open position—and thus the first lock 100 itself is open—when power (the first closing signal) is not applied to the first lock 100, and the first contacts 102 are in the lower, closed position when power is continually applied to the first lock 100.

However, the structure of the first lock 100 is not limited only to that described herein. Other arrangements that produce similar functionality may be equally suitable.

As shown in FIG. 2, the second lock includes second contacts 202. The second contacts 202 are in electrical communication with the load conductors 204, which in turn are in communication with the load 4 (not shown in FIG. 2).

The second contacts 202 are in communication with the load conductors 204 via slider contacts 210. As shown, the second contacts 202 are fixedly mounted to the slider contacts 210. However, the slider contacts 210 are not fixedly connected to the load conductors 204. Although the load conductors 204 are in direct contact with the slider contacts 210, the slider contacts 210 are slideably moveable with regard to the load conductors 204. That is, the slider contacts 210 may be displaced in a sliding motion with respect to the load conductors 204, while still remaining in electrical contact with the load conductors 204.

The second contacts 202 may be electrically engaged with the slider contacts 210 in any convenient fashion, including but not limited to welding, riveting, staking, conductive adhesive, clamps, etc.

The slider contacts 210 are fixedly engaged with a slider assembly 208. The slider assembly 208 in turn is slideably movable with respect to the load conductors 204. In the arrangement illustrated, the slider assembly 208 moves linearly and vertically up and down, though such an arrangement is exemplary only.

Because the second contacts 202 are fixedly engaged with the slider contacts 210, and the slider contacts 210 are fixedly engaged with the slider assembly 208, moving the slider assembly 208 also causes the second contacts 202 to move. In this manner, the second contacts 202 are movable between upper and lower positions, which correspond to closed and open positions, respectively. Thus, the second lock 200 is actuable between closed and open states.

As described previously, the second lock 200 operates in such fashion that applying a second opening signal opens the second lock 200, and applying a second closing signal closes the second lock 200. FIG. 2 shows one arrangement by which this may be achieved, through the use of a latching piston 212.

As shown, the slider assembly 208 defines a piston recess 214 therein. A latching piston 212 is disposed within the piston recess 214. The latching piston 212 and piston recess 214 are configured such that they are movable linearly and vertically with respect to one another. With regard to the circuit interrupter 10 as a whole, the latching piston 212 is movable within the piston recess 214, and the slider assembly 208 also is movable with the latching piston 212 therein. Moving either of the latching piston 212 and the slider assembly 208 does not directly or necessarily move the other; one may move without the other moving.

A second actuator 206 is fixedly engaged with the slider assembly 208. The second actuator 206 is engaged with the second contacts 202 so as to actuate the second contacts 202 between their open and closed positions. In the exemplary embodiment shown in FIG. 2, this is arranged as follows.

The second actuator 206 may include a plunger 216 movably disposed therein. As shown in FIG. 2, the plunger 216 is retracted. However, the plunger 216 may be moved so as to engage a plunger latch notch 226 defined in the latching piston 212. (This motion is described in greater detail below.) With the plunger 216 engaged with the plunger latch notch 226, the plunger 216 holds the latching piston 212 fixed with respect to the second actuator 206. The second actuator 206 is fixed with respect to the slider assembly 208, and thus the slider assembly, slider contacts 210 and second contacts 202 also are held fixed with respect to the latching piston 212 in such a circumstance.

The second lock 200 may include a reset button 222 engaged with the latching piston 212, such that pressing the reset button 222 displaces the latching piston 212.

The second lock 200 also may include a slider bias 218 to bias the slider assembly 208 towards its lower position, so that the second contacts 202 likewise are biased thereby towards their lower or open position. As shown, the slider bias is an extension spring disposed between the housing 12 of the circuit interrupter 10 and the slider assembly 208. However, this is exemplary only, and other arrangements may be equally suitable.

In addition, the second lock may include a piston bias 224 to bias the latching piston 212 toward its upper position. With such an arrangement, the latching piston 212 as well as the reset button 222 are biased towards their upper position when the plunger 216 is not engaged with the plunger latch notch 226 in the latching piston 212. When the plunger 216 is engaged with the plunger latch notch 226 in the latching piston 212, the piston bias 224 also biases the slider assembly 208 and consequently the second contacts 202 towards their upper or closed position.

Typically, the piston bias 224 is stronger than the slider bias 218, since the piston bias 224 must overcome the slider bias 218 when the plunger 216 is engaged with the plunger latch notch 226 in the latching piston 212. As illustrated, the piston bias 224 is a compression spring disposed between the reset button 222 and the housing 12 of the circuit interrupter 10. However, this is exemplary only, and other arrangements may be equally suitable.

Also, the second actuator 206 may include a plunger bias 220 to bias the plunger towards the latching piston 212. With such an arrangement, the plunger 216 will tend to engage the plunger latch notch 226 whenever the plunger 216 is not actively retracted by the second actuator 206 (and so long as the latching piston 212 is depressed sufficiently that the plunger latch notch 226 aligns with the plunger 216). However, such an arrangement is exemplary only.

It is noted that, for purposes of clarity in showing the distinction between the plunger 216 and the latching piston 212, the plunger 216 is shown retracted rather than in direct contact with the latching piston 212. In certain embodiments, the plunger 216 actually may be in contact with the latching piston 212 at least on occasion when the plunger 216 is not engaged with the plunger latch notch 226 in the latching piston 212. Further discussion of the interaction between the plunger 216 and the plunger latch notch 226 in the latching piston 212 is provided below.

FIGS. 2–5 show various states of the circuit interrupter 10, with various combinations of the open and closed states of the first and second locks 100 and 200. The circuit interrupter 10 as shown has four stable states, referred to herein as the first, second, third, and fourth states.

FIG. 2 illustrates an arrangement wherein the first and second locks 100 and 200 are both open. The first contacts 102 are raised to their upper position, which is their open position. The second contacts 202 are depressed to their lower position, which is their open position. This arrangement, with both the first and second locks 100 and 200 open, represents the first state of the circuit interrupter 10. It is analogous to the arrangement illustrated schematically in FIG. 1A. In the first state, the circuit interrupter 10 is open.

The circuit interrupter 10 is stable in the first state, shown in FIG. 2, as follows. In the first lock 100, no electrical power is applied to the drive conductors 104. Consequently, the first actuator 106, in the case illustrated a solenoid, is not energized. With the first actuator 106 solenoid un-energized, the lower armature 110 is not attracted thereto. The first actuator bias 114 biases the lower armature 110 upwards, and in the absence of attraction between the first actuator 106 solenoid and the lower armature 110 the lower armature 110 remains in the upper position. The first contacts 102, engaged with the lower armature 110 via the upper armature 108, also remain in their upper or open position.

In the second lock 200, the plunger 216 and the plunger latch notch 226 are not engaged. Thus, the piston bias 224 biases the latching piston 212 upwards, but does not affect the slider assembly 208, or the second contacts engaged therewith. Rather, the slider bias 218 biases the slider assembly 208 downwards. Absent an upward bias from the piston bias 224, the slider assembly 208 remains in its lower position. The second contacts 202 thus remain in their lower or open position.

Figure 3:
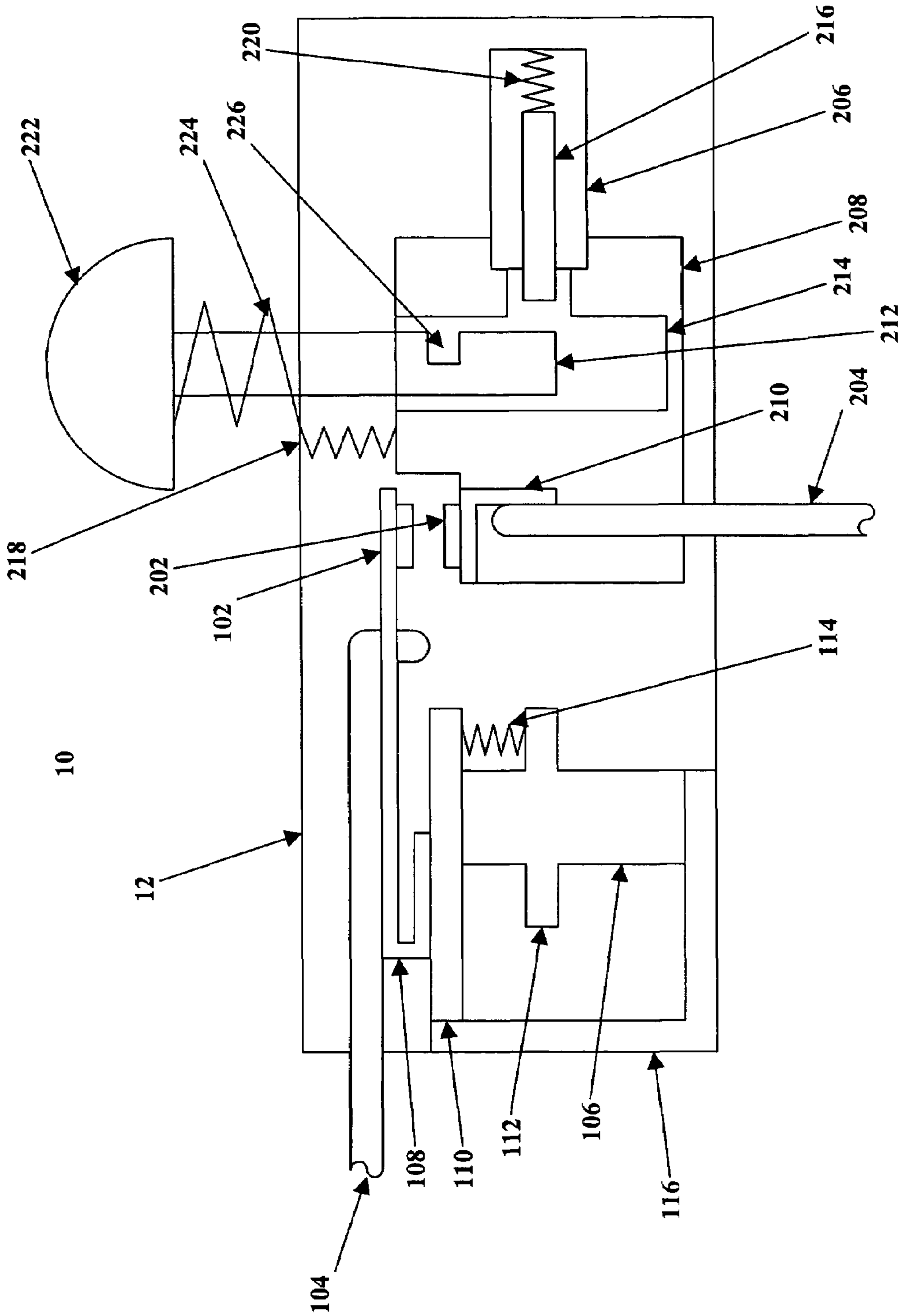
FIG. 3 is a block view of the apparatus of FIG. 2, shown with the first lock closed and the second lock open.

FIG. 3 illustrates an arrangement wherein the first lock 100 is closed, and the second lock 200 is open. The first contacts 102 are depressed to their lower position, which is their closed position. The second contacts 202 are depressed to their lower position, which is their closed position. This arrangement, with the first lock 100 closed and the second lock 200 open, represents the second state of the circuit interrupter 10. It is analogous to the arrangement illustrated schematically in FIG. 1B. In the second state, the circuit interrupter 10 is open.

The circuit interrupter 10 is stable in the second state, shown in FIG. 3, as follows. In the first lock 100, electrical power is applied to the drive conductors 104. Consequently, the first actuator 106 solenoid is energized. With the first actuator 106 solenoid energized, the lower armature 110 is attracted thereto. Although the first actuator bias 114 biases the lower armature 110 upwards, the attraction between the first actuator 106 solenoid and the lower armature 110 is stronger than the first actuator bias 114, and causes the lower armature 110 to be in the lower position. The first contacts 102, engaged with the lower armature 110 via the upper armature 108, also are in their lower or closed position.

In the second state, the second lock 200 is open as in the first state. The plunger 216 and the plunger latch notch 226 are not engaged. The piston bias 224 biases the latching piston 212 upwards, but does not affect the slider assembly 208, or the second contacts engaged therewith. The slider bias 218 biases the slider assembly 208 downwards. Absent an upward bias from the piston bias 224, the slider assembly 208 remains in its lower position. The second contacts 202 thus remain in their lower or open position.

Figure 4:
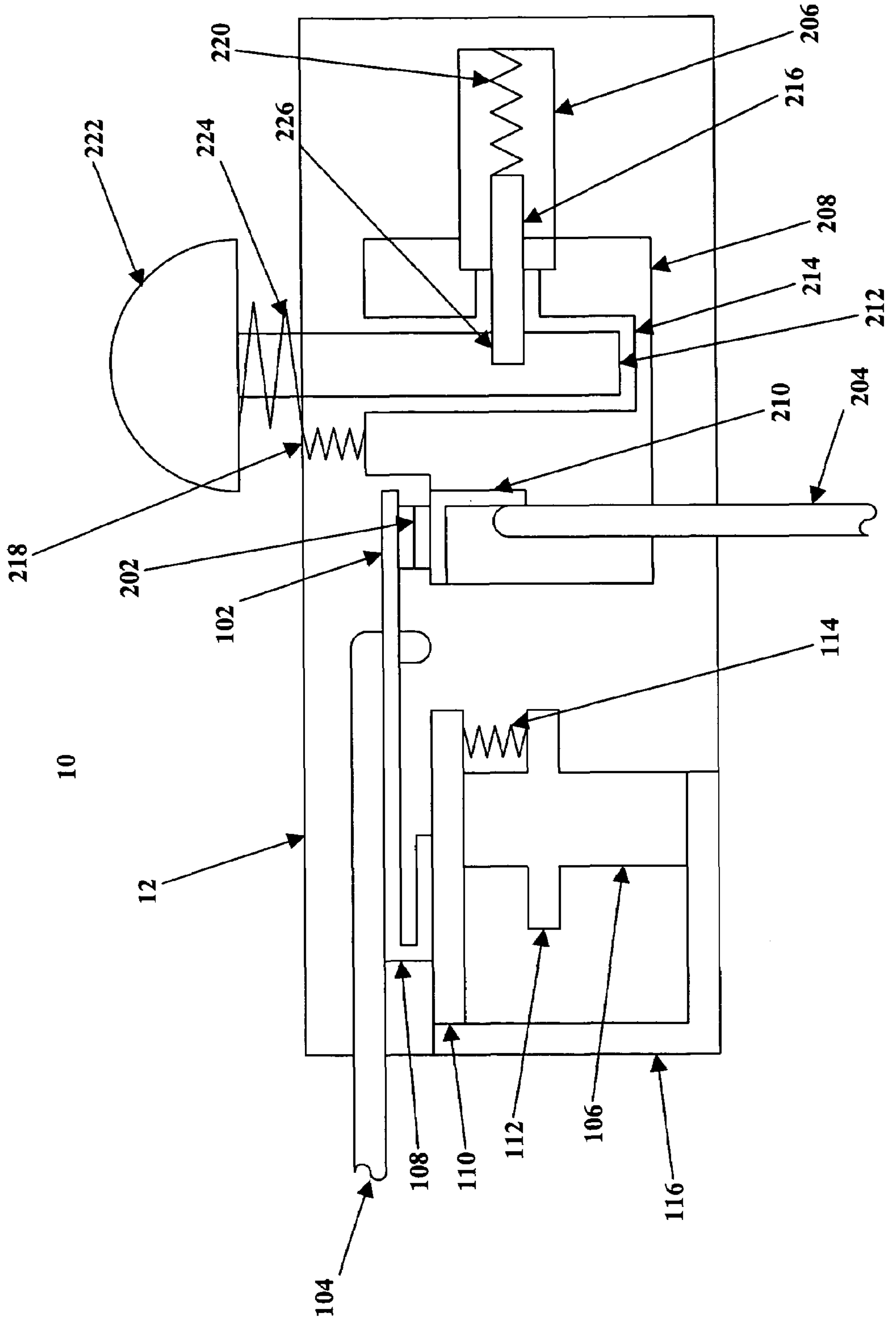
FIG. 4 is a block view of the apparatus of FIG. 2, shown with the first and second locks closed.

FIG. 4 illustrates an arrangement wherein the first and second locks 100 and 200 are both closed. As in the first state, the first contacts 102 are depressed to their lower position, which is their closed position. In addition, the second contacts 202 are raised to their upper position, which is their closed position. This arrangement, with the first and second locks 100 and 200 both closed, represents the third state of the circuit interrupter 10. It is analogous to the arrangement illustrated schematically in FIG. 1C. In the third state, the circuit interrupter 10 is closed.

The circuit interrupter 10 is stable in the third state, shown in FIG. 4, as follows. The first lock 100 is arranged as in the second state. Electrical power is applied to the drive conductors 104. The first actuator 106 solenoid is energized.

With the first actuator 106 solenoid energized, the lower armature 110 is attracted thereto. Although the first actuator bias 114 biases the lower armature 110 upwards, the attraction between the first actuator 106 solenoid and the lower armature 110 causes the lower armature 110 to be in the lower position. The first contacts 102, engaged with the lower armature 110 via the upper armature 108, also are in their lower or closed position.

In the third state, the second lock 200 also is closed. Either no fault has been detected, and so the second actuator 206 has not withdrawn the plunger 216, or any fault conditions have been reset, and the plunger 216 has been reinserted into the plunger latch notch 226. Thus, the plunger 216 and the plunger latch notch 226 are engaged. The piston bias 224 biases the latching piston 212 upwards. Because the plunger 216 and piston 212 are engaged, the piston bias 224 also biases the slider assembly 208 upwards. The second contacts 202 engaged therewith also are biased upwards. The slider bias 218 biases the slider assembly 208 downwards. However, as previously noted the upward bias from the piston bias 224 is stronger than the downward bias from the slider bias 218. Thus, the slider assembly 208 is in its upper position. The second contacts 202 also are in their upper or closed position.

FIG. 5 illustrates an arrangement wherein the first lock 100 is open and the second lock 200 is closed. The first contacts 102 are raised to their upper position, which is their open position. The second contacts 202 are raised to their upper position, which is their closed position. This arrangement, with the first lock 100 open and the second lock 200 closed, represents the fourth state of the circuit interrupter 10. It is analogous to the arrangement illustrated schematically in FIG. 1D. In the fourth state, the circuit interrupter 10 is open.

The circuit interrupter 10 is stable in the fourth state, shown in FIG. 5, as follows. The first lock 100 is arranged as in the first state. No electrical power is applied to the drive conductors 104. Consequently, the first actuator 106 solenoid is not energized. With the first actuator 106 solenoid un-energized, the lower armature 110 is not attracted thereto. The first actuator bias 114 biases the lower armature 110 upwards, and in the absence of attraction between the first actuator 106 solenoid and the lower armature 110 the lower armature 110 remains in the upper position. The first contacts 102, engaged with the lower armature 110 via the upper armature 108, also remain in their upper or open position.

In the fourth state, the second lock 200 also is closed as in the third state. The plunger 216 and the plunger latch notch 226 are engaged. The piston bias 224 biases the latching piston 212 upwards. Because the plunger 216 and piston 212 are engaged, the piston bias 224 also biases the slider assembly 208 upwards. The second contacts 202 engaged therewith also are biased upwards. The slider bias 218 biases the slider assembly 208 downwards. However, the upward bias from the piston bias 224 is stronger than the downward bias from the slider bias 218, so the slider assembly 208 is in its upper position. The second contacts 202 also are in their upper or closed position.

More with regard to function, the first state of the circuit interrupter 10 corresponds to a circumstance wherein there is no electrical power in the circuit, and a fault has been detected in the circuit (and/or it has not been reset).

The second state corresponds to a circumstance wherein there is electrical power, but a fault has been detected in the circuit (and/or it has not been reset).

The third state corresponds to a circumstance wherein there is electrical power, and there is no fault in the circuit.

The fourth state corresponds to a circumstance wherein there is no electrical power, but no fault previously has occurred in the circuit.

For the exemplary embodiment illustrated in FIGS. 2–5, actuation between states, whether defined as states one through four of the circuit interrupter 10 as a whole or as open and closed states of each of the first and second locks 100 and 200, may occur as follows.

As previously described, while power is applied to the drive conductors 104 the first actuator 106 solenoid is energized, and while power is not so applied the first actuator 106 solenoid is not energized. Thus, while power is applied, the first contacts 102 are closed, and while power is not applied the first contacts 102 are open. Electrical power applied from the drive source 2 thus serves as the first closing input.

When power is initially applied, the first actuator 106 solenoid is energized. It attracts the lower armature 110 to it, closing the first contacts 102. Conversely, when power is initially shut off, the first actuator 106 solenoid is de-energized. It no longer attracts the lower armature 110 to it, and the first actuator bias 114 opens the first contacts 102.

This may be considered to represent an "auto-power on" feature, for such embodiments.

With regard to the second lock 200, with the plunger 216 engaged with the plunger latch notch 226 in the latching piston 212, the piston bias 224 causes the second contacts 202 to be in their upper, closed position.

When a fault signal is applied to the second actuator 206, i.e. by a fault detector in communication with the circuit interrupter 10, the second actuator withdraws the plunger 216. The plunger 216 and the latching piston 212 are no longer engaged. Thus, the latching piston 212 and the reset button 222 are moved upwards under the influence of the piston bias 224. In addition, the slider assembly 208, no longer under the influence of the piston bias 224, moves downwards under the influence of the slider bias 218. The second contacts 202 are opened.

Depending on the particular embodiment, when the fault signal is no longer applied to the second actuator 206, the plunger 216 may again be pressed towards the latching piston 212. However, because the latching piston 212 has been raised, the plunger 216 cannot engage with the latching piston 212 in that configuration. Simply discontinuing the fault signal does not return the second lock 200 to the closed state.

Thus, for this exemplary embodiment, the fault signal serves as the second opening input.

In order to return the second lock 200 to its closed state, positive action is required. For the arrangement illustrated, depressing the reset button 222 serves this purpose. Assuming the fault signal is no longer present, and the plunger 216 thus is no longer retracted, depressing the reset button 222 also depresses the latching piston 212, until the plunger latch notch 226 aligns with the plunger 216. At that point, the plunger 216 and the plunger latch notch 226 engage. The latching plunger 212 rises under the influence of the piston bias 224, as does the slider assembly 208 and the second contacts 202. Thus, the second contacts 202 are returned to their closed position.

As described, then, the exemplary second lock 200 shown functions such that when a second opening input is applied to the second lock the second lock opens, and when a second closing input is applied to the second lock the second lock closes.

Thus, the circuit interrupter may be considered to have a "memory" of the fault status. That is, changing the state of the first lock does not affect the state of the second lock, or vice versa. In particular, changing the state of the first lock 100, which is closed when power is applied and open when power is not applied, does not change the state of the second lock 200, which is open after a fault has been detected and closed if no such fault has been detected, and if the second lock 200 has been reset after a fault was removed.

So, for this exemplary embodiment, a manual reset of the reset button 222 serves as the second closing input.

It is particularly noted, however, that the second closing input need not be limited to a manual reset of the reset button 222. An actuating mechanism for remotely resetting the second lock 200 so as to return it to its closed state may be equally suitable.

In addition, the circuit interrupter 10 may include a mechanism for manually or otherwise deliberately opening the second lock 200 without the presence of a fault. This may be useful for certain embodiments, for example, in order to assure that the circuit cannot be activated even if power is applied, and the first lock 100 is closed.

Furthermore, manual actuation is not limited only to use as a second closing input. Either or both of the first and second locks 100 and 200 may be responsive to manual actuators to close or open them. For example, the second lock 200 may be responsive to manual actuation from the closed to the open state. Thus, an "artificial" fault may be created, for example to test the system. Other arrangements likewise may be suitable.

It is noted generally that arrangements other than those presented with regard to this exemplary embodiment may be equally suitable. Variations may include, but are not limited to, different mechanical arrangements of the various components described herein. For example, as shown in FIG. 2, the first and second locks 100 and 200 are in series with one another. As may be seen from the arrangement of the drive conductors 104 and the load conductors 204, the first and second locks 100 and 200 also are in series between the drive source 2 and the load 4 (not shown in FIG. 2).

One further variation is an arrangement such as that illustrated in FIG. 7. Therein, an exemplary embodiment of a fault circuit interrupter 10 in accordance with the principles of the present invention, disposed within a circuit. The circuit interrupter 10 in FIG. 7 is somewhat similar to that in FIG. 1. However, The embodiment in FIG. 7 includes control circuitry 150 disposed between the driving source 2 and the first lock 100.

The control circuitry 150 controls the actuation of the first and second locks 100 and 200. More particularly, the control circuitry 150 actuates both the first and second locks 100 and 200 when conditions are such that either lock otherwise would open. If the first lock 100 opens, the control circuitry 150 causes the second lock 200 to open (if it is not already open), and if the second lock 200 opens the control circuitry 150 likewise causes the first lock 100 to open (if it is not already open).

Thus, the control circuitry 150 controls the first and second locks 100 and 200 such that while the first closing input is not applied to the first lock 100, the first and second locks 100 and 200 are open, and when the second opening input is applied to the second lock 200 the first and second locks 100 and 200 open.

With such an arrangement, either a loss of power or a fault results in the circuit interrupter 10 moving to the first state, with both the first and the second locks 100 and 200 open.

Figure 7A:
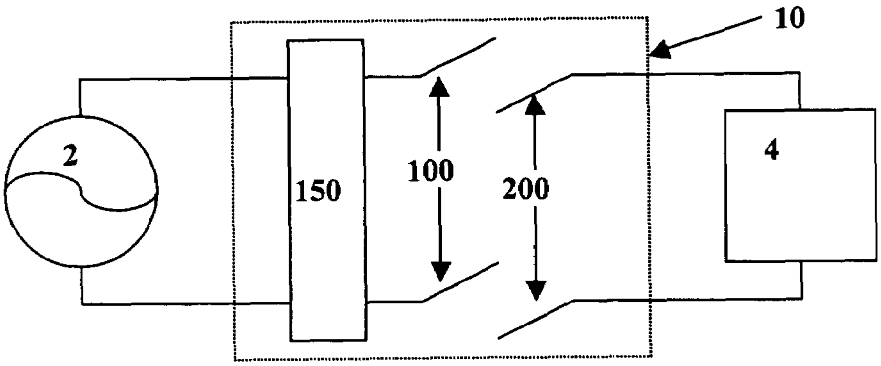
FIG. 7 is an electrical schematic of an exemplary embodiment of an apparatus for circuit interruption in accordance with the principles of the claimed invention.
Figure 7B:
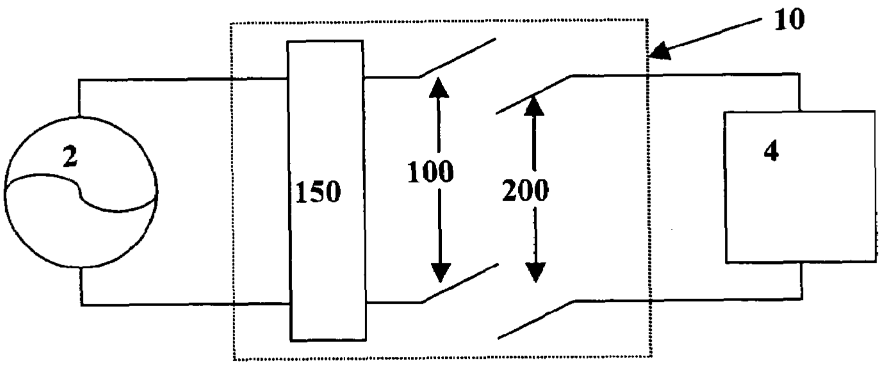
Figure 7D:
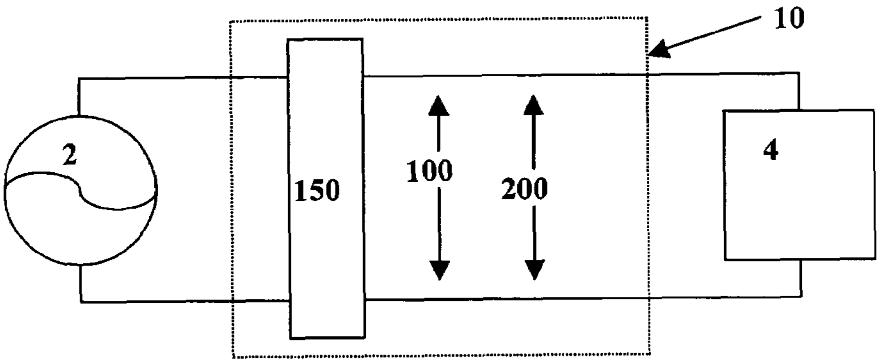
Figure 7C:
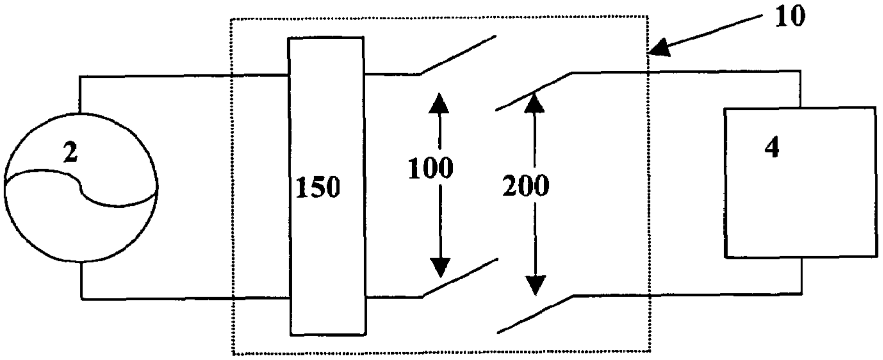

Thus, although the conditions initiating the opening of the circuit interrupter 10 in FIGS. 7B and 7D are similar to those for FIGS. 1B and 1D, the result is that, as shown, in FIG. 7 both the first and second locks 100 and 200 are open in both instances.

This may be advantageous for certain embodiments. For example, consider an embodiment such as that illustrated in FIGS. 2-6, wherein first and second contacts 102 and 202 are movable linearly and vertically. In the first state the clearance between the first and second contacts 102 and 202 is greater than in the second or fourth states.

A greater clearance may provide greater resistance to possible arcing or other undesired phenomena while the circuit is interrupted. A greater clearance also may enable more convenient manual determination that a circuit has been opened, i.e. a louder "click" as both relays open. Increased clearance also may provide for other useful features.

In certain embodiments, the control circuitry 150 may be such that it only opens one lock or the other. For example, the control circuitry 150 may be such that it open the second lock 200 if the first lock 100 opens, but does not open the first lock 100 if the second lock 200 opens. The reverse also may be true for certain embodiments.

It is noted that even for embodiments using control circuitry 150 as described, the first and second locks 100 and 200 are still independent from each other. That is, the state of the first lock 100 does not directly affect the state of the second lock 200, nor does the state of the second lock 200 directly affect the state of the first lock 100. Rather, it is the control circuitry 150 that may, in certain embodiments, open (or close) the first lock 100 in response to the state of the second lock 200, or vice versa.

As illustrated, when closed the first and second locks 100 and 200 are in series by way of direct contact between the first contacts 102 and the second contacts 202. However, this is exemplary only; other arrangements wherein the first and second locks 100 and 200 are in series may be equally suitable. For example, the first contacts 102 and second contacts 202 may, when closed, make contact with a conductive bridge that serves as an electrical pathway between the two locks 100 and 200.

Also, as illustrated the drive conductors 104 and load conductors 204 are directly connected to the first and second locks 100 and 200. However, an arrangement wherein the drive conductors 104 and load conductors 204 are connected using various connectors, including but not limited to quick-connection connectors, may be equally suitable. For example, such an arrangement may be especially suitable for embodiments including but not limited to those wherein the circuit interrupter 10 is adapted to be incorporated into an existing circuit as a retrofit.

Furthermore, it is particularly noted that various embodiments of the present invention may be adapted for use with various currents and voltages, and either AC or DC power. Moreover, as previously indicated, the present invention is not limited exclusively to electrical circuit interruption.

When used for electrical circuit interruption, the present invention is not limited only to the arrangement shown and described herein. Through use of expanding and collapsing magnetic fields in the presence or absence of electricity, as appropriate, the functional block of the present invention may be used in a variety of applications. For example, embodiments of the present invention may be suitable for use with circuit categories including, but not limited to, ALCI, GFCI, AFCI, RCD, timer, undervoltage, overvoltage, overcurrent, and/or surge protection.

It is emphasized that the term "fault" is not limited to any particular type of fault. For an electrical circuit, faults that may be used to trigger the circuit interrupter include, but are not limited to, GFCI, AFCI, RCD, timer, undervoltage, overvoltage, overcurrent, and surge protection. Although arc fault circuit interruption (AFCI) is presented herein as an exemplary arrangement, the present invention is not limited only to arc fault circuit interruption.

Moreover, the present invention is not limited only to the particular arrangement of electrical circuits shown and described herein. Embodiments of the present invention may be suitable for use with circuits operating at a variety of AC and DC voltages, and/or a variety of AC and DC currents.

Although the present invention is described herein in terms of a device that is integrated into a circuit, this is exemplary only. Certain embodiments of the present invention may be suitable for partial or total integration into larger circuits, appliances, or other devices. However, other embodiments of the present invention may be suitable for use as modules used with other circuits or devices. Such arrangements may include, but are not limited to, retrofitting modules that provide circuit interruption functions to other devices that previously may have lacked such functions. Furthermore, some embodiments of the present invention may be suitable for use as fully independent devices. For example, certain embodiments might be formed as separate external units, for providing circuit interruption functions without necessarily being incorporated into or directly connected to other circuits or devices.

The above specification, examples and data provide a complete description of the manufacture and use of the composition of the invention. Since many embodiments of the invention can be made without departing from the spirit and scope of the invention, the invention resides in the claims hereinafter appended.

I claim:

1. An electrical circuit interrupter, comprising:

a first lock and a second lock, said first and second locks being in series with one another, and being in series between a driving source of said circuit and a load of said circuit, such that when said first lock is closed and said second lock is closed said circuit is closed, and when at least one of said first and second locks is open said circuit is open; said first lock comprising:

first contacts in electrical communication with said driving source, said first contacts being movable between an open position and a closed position, wherein when said first contacts are in said open position, said first lock is open, and when said first contacts are in said closed position, said first lock is closed; and a first actuator comprising a solenoid operable for expanding and collapsing a magnetic field and engaged with said first contacts so as to actuate said first contacts between said open and closed positions, such that while said first closing input is applied to said first contacts said first contacts are in said closed position, and while said first closing input is not applied to said first contacts said first contacts are in said open position, wherein:

said first lock is operatively connected to said driving source of said circuit;

actuating said first lock between open and closed states does not change a state of said second lock, and actuating said second lock between open and closed states does not change a state of said first lock;

while a first closing input is applied to said first lock said first lock is closed, and while said first closing input is not applied to said first lock said first lock is open;

when a second opening input is applied to said second lock said second lock opens, and when a second closing input is applied to said second lock said second lock closes.

2. The circuit interrupter according to claim 1, wherein said first closing input is a driving signal for said circuit.

3. The circuit interrupter according to claim 1, wherein said second lock comprises:

second contacts in electrical communication with said load of said circuit, said second contacts being movable between an open position and a closed position, wherein when said second contacts are in said open position, said second lock is open, and when said second contacts are in said closed position, said second lock is closed;

a second actuator engaged with said second contacts so as to actuate said second contacts between said open and closed positions, such that when said second opening input is applied to said second contacts said second actuator opens said second contacts, and when said second closing input is applied to said second contacts said second actuator closes said second contacts.

4. The circuit interrupter according to claim 3, wherein:

said second actuator comprises a device operable for expanding and contracting a magnetic field.

5. The circuit interrupter according to claim 4, wherein:

said device is a solenoid.

6. The circuit interrupter according to claim 1, wherein:

said second lock comprises a manual actuator for manually actuating said second lock between said open and closed states.

7. The circuit interrupter according to claim 1, wherein:

said control circuitry controls said first and second locks such that while said first closing input is not applied to said first lock, said first and second locks are open, and when said second opening input is applied to said second lock said first and second locks open.

8. A circuit interrupter, comprising:

a first lock and a second lock, said first and second locks being in series with one another, and being in series between a driving source of said circuit and a load of said circuit, such that when said first lock is closed and said second lock is closed said circuit is closed, and when at least one of said first and second locks is open said circuit is open;

wherein:

said first lock is operatively connected to said driving source of said circuit;

actuating said first lock between open and closed states does not change a state of said second lock, and actuating said second lock between open and closed states does not change a state of said first lock;

while a first closing input is applied to said first lock said first lock is closed, and while said first closing input is not applied to said first lock said first lock is open;

when a second opening input is applied to said second lock said second lock opens, and when a second closing input is applied to said second lock said second lock closes, wherein:

said second opening input is a fault signal indicative of a fault in said circuit; and said second closing input is a reset signal.

9. The circuit interrupter according to claim 8, further comprising:

control circuitry controlling actuation of said first and second locks, said control circuitry being disposed such that said first lock is operatively connected to said driving source via said control circuitry.

10. An arc fault circuit interrupter, comprising:

an arc fault detector; and a circuit interrupter according to claim 8;

wherein said second lock is engaged with said arc fault detector such that when said arc fault detector detects said fault, said second lock opens.

11. An electrical circuit interrupter, comprising:

a first lock and a second lock, said first and second locks being in series with one another, and being in series between a driving source of said circuit and a load of said circuit, said first lock being operatively connected to a driving source of said circuit;

said circuit interrupter being actuable among first, second, third, and fourth states, such that:

in said first state, said first lock is open, and said second lock is open, whereby said circuit interrupter is open;

in said second state, said first lock is closed, and said second lock is open, whereby said circuit interrupter is open;

in said third state, said first lock is closed, and said second lock is closed, whereby said circuit interrupter is closed;

in said fourth state, said first lock is open, and said second lock is closed, whereby said circuit interrupter is open;

wherein:

while a first closing input is applied to said first lock said first lock is closed, and while said first closing input is not applied to said first lock said first lock is open;

when a second opening input is applied to said second lock said second lock opens, and when a second closing input is applied to said second lock said second lock closes;

actuating said first lock between open and closed states does not change a state of said second lock, and actuating said second lock between open and closed states does not change a state of said first lock, wherein:

said first lock comprises:

first contacts in electrical communication with said driving source, said first contacts being movable between an open position and a closed position;

a first actuator engaged with said first contacts so as to actuate said first contacts between said open and closed positions;

said second lock comprises:

second contacts in electrical communication with a load of said circuit, said second contacts being movable between an open position and a closed position;

a second actuator engaged with said second contacts so as to actuate said second contacts between said open and closed positions;

wherein:

in said first state, said first contacts are in said open position such that said first lock is open, and said second contacts are in said open position such that said second lock is open, whereby said interrupter is open;

in said second state, said first contacts are in said closed position such that said first lock is closed, and said second contacts are in said open position such that said second lock is open, whereby said interrupter is open;

in said third state, said first contacts are in said closed position such that said first lock is closed, and said second contacts are in said closed position such that said second lock is closed, whereby said interrupter is closed;

in said fourth state, said first contacts are in said open position such that said first lock is open, and said second contacts are in said closed position such that said second lock is closed, whereby said interrupter is open wherein said first and second actuators each comprise a device operable for expanding and collapsing a magnetic field.

12. The circuit interrupter according to claim 11, wherein:

said devices are solenoids.

13. The circuit interrupter according to claim 11, wherein:

wherein said first closing input is a driving signal for said circuit.

14. An arc fault circuit interrupter, comprising:

an arc fault detector; and a circuit interrupter according to claim 13;

wherein said second lock is engaged with said arc fault detector such that when said arc fault detector detects an arc fault, said fault signal is applied to said second lock, whereby said second lock opens.

15. The circuit interrupter according to claim 11, wherein:

said second opening input is a fault signal indicative of a fault in said circuit; and said second closing input is a reset signal.

16. The circuit interrupter according to claim 11, wherein:

said second lock comprises a manual actuator for manually actuating said second lock between said open and said closed states.

17. A method of circuit interruption, comprising:

disposing first and second locks in series with one another, and in series between a driving source of said circuit and a load of said circuit, wherein said first lock is operatively connected to said driving source of said circuit;

maintaining said first lock closed while a first closing input is applied thereto, and maintaining said first lock open while a first closing input is not applied thereto;

opening said second lock when a second opening input is applied thereto, and closing said second lock when a second closing input is applied thereto;

wherein said first and second locks are independent of one another with regard to being open or closed;

wherein:

said second opening input is a fault signal indicative of a fault in said circuit; and said second closing input is a reset signal.

18. The method according to claim 17, wherein:

said first closing input is a driving signal for said circuit.

19. The method according to claim 18, wherein:

said second opening input is an arc fault signal indicative of an arc fault in said circuit.

20. The method according to claim 17, further comprising:

maintaining said first and second locks open while a first closing input is not applied to said first lock; and opening said first and second locks when said second opening input is applied to said second lock.

* * * * *